United States Patent
Cho et al.

(10) Patent No.: US 8,637,182 B2
(45) Date of Patent: Jan. 28, 2014

(54) SECONDARY BATTERY INCLUDING A PLURALITY OF ALIGNED POSITIVE AND NEGATIVE ELECTRODE TABS

(75) Inventors: Jakyung Cho, Suwon-si (KR); Changbum Ahn, Suwon-si (KR)

(73) Assignee: Samsung SDI Co., Ltd., Yongin-Si, Gyeonggi-Do (KR)

( * ) Notice: Subject to any disclaimer, the term of this patent is extended or adjusted under 35 U.S.C. 154(b) by 463 days.

(21) Appl. No.: 12/949,232

(22) Filed: Nov. 18, 2010

(65) Prior Publication Data

US 2011/0117406 A1    May 19, 2011

(30) Foreign Application Priority Data

Nov. 18, 2009    (KR) .................. 10-2009-0111455

(51) Int. Cl.
*H01M 2/02*  (2006.01)
*H01M 2/26*  (2006.01)
*H01M 4/00*  (2006.01)

(52) U.S. Cl.
USPC .............................. 429/211; 429/94; 429/163

(58) Field of Classification Search
USPC ................. 429/211, 161, 94, 3, 163; 29/623.1
See application file for complete search history.

(56) References Cited

U.S. PATENT DOCUMENTS

| | | | |
|---|---|---|---|
| 5,707,758 A | 1/1998 | Iwatsu et al. | |
| 6,106,975 A | 8/2000 | Watanabe et al. | |
| 6,379,840 B2 * | 4/2002 | Kitoh et al. | 429/211 |
| 2002/0061435 A1 * | 5/2002 | Hisai | 429/94 |
| 2002/0068217 A1 * | 6/2002 | Watanabe et al. | 429/94 |
| 2002/0146620 A1 * | 10/2002 | Connell | 429/161 |
| 2004/0038122 A1 | 2/2004 | Hisamitsu et al. | |
| 2007/0269685 A1 * | 11/2007 | Chu et al. | 429/3 |
| 2008/0060189 A1 * | 3/2008 | Daidoji et al. | 29/623.1 |
| 2010/0086845 A1 | 4/2010 | Jung et al. | |
| 2010/0124694 A1 | 5/2010 | Hikata et al. | |
| 2010/0239902 A1 | 9/2010 | Hisamitsu et al. | |
| 2010/0263201 A1 | 10/2010 | Hisamitsu et al. | |

FOREIGN PATENT DOCUMENTS

| | | | |
|---|---|---|---|
| EP | 1207565 A2 | 5/2002 | |
| EP | 1796186 A1 | 6/2007 | |
| EP | 1901387 A2 | 3/2008 | |
| EP | 2187466 A1 | 5/2010 | |
| JP | 10-162861 A | 6/1998 | |
| JP | 10-326609 A | 12/1998 | |
| JP | 2002-157991 A | 5/2002 | |
| JP | 2004-087260 A | 3/2004 | |

(Continued)

OTHER PUBLICATIONS

Machine Translation of: JP 2005209494 A, Minoura et al., Aug. 4, 2005.*

(Continued)

*Primary Examiner* — Kenneth Douyette
(74) *Attorney, Agent, or Firm* — Lee & Morse, P.C.

(57) ABSTRACT

A secondary battery, including an electrode assembly including a first electrode plate, a second electrode plate, and a separator disposed between the first and second electrode plates, wherein the electrode assembly includes a first electrode tab including a plurality of stacked first unit tabs protruding from the first electrode plate; and a second electrode tab including a plurality of stacked second unit tabs protruding from the second electrode plate, wherein the first electrode tab has a width, the width being greater than widths of each of the first unit tabs.

12 Claims, 4 Drawing Sheets

(56) References Cited

FOREIGN PATENT DOCUMENTS

| JP | 2005-209494 A | 8/2005 |
|---|---|---|
| JP | 2006-196379 A | 7/2006 |
| JP | 2008-066170 A | 3/2008 |
| JP | 2010-118315 A | 5/2010 |
| KR | 10-0213657 B1 | 8/1999 |
| KR | 10 2003-0040812 A | 5/2003 |
| KR | 10 2006-0033642 A | 4/2006 |
| KR | 10-0821857 B1 | 4/2008 |
| WO | WO 2008/126538 A1 | 10/2008 |

OTHER PUBLICATIONS

EP Search Report in EP 10191710.2-1227, dated Mar. 1, 2011 (Cho, et al.), European Search Report from prosecution of corresponding European application.

Korean Office Action in KR 10-2009-0111455, dated Dec. 30, 2011 (Cho, et al.).

Japanese Office Action in JP 2010-025309, dated Aug. 28, 2012 (Cho, et al.).

\* cited by examiner

SECONDARY BATTERY INCLUDING A PLURALITY OF ALIGNED POSITIVE AND NEGATIVE ELECTRODE TABS

CROSS REFERENCE TO RELATED APPLICATIONS

Korean Patent Application No. 10-2009-0111455, filed on Nov. 18, 2009, in the Korean Intellectual Property Office, and entitled: "Secondary Battery," is incorporated by reference herein in its entirety.

BACKGROUND

1. Field

Embodiments relate to a secondary battery.

2. Description of the Related Art

In general, a secondary battery is formed by housing an electrode assembly with electrolyte in an external case. The electrode assembly may include a positive electrode plate, a negative electrode plate, and a separator interposed between the two electrode plates.

An electrode assembly with a plurality of positive electrode tabs and a plurality of negative electrode tabs may be required to form a high capacity secondary battery.

SUMMARY

Embodiments are directed to a secondary battery which represents advances over the related art.

It is a feature of an embodiment to provide a secondary battery provided with an electrode assembly including a plurality of aligned positive electrode tabs and a plurality of aligned negative electrode tabs.

It is another feature of an embodiment to provide a secondary battery that achieves efficient use of space.

It is another feature of an embodiment to provide a secondary battery that is resistant to deformation during fabrication.

At least one of the above and other features and advantages may be realized by providing a secondary battery including an electrode assembly including a first electrode plate, a second electrode plate, and a separator disposed between the first and second electrode plates, wherein the electrode assembly includes a first electrode tab including a plurality of stacked first unit tabs protruding from the first electrode plate; and a second electrode tab including a plurality of stacked second unit tabs protruding from the second electrode plate, wherein the first electrode tab has a width, the width being greater than widths of each of the first unit tabs.

The first and second electrode plates and the separator of the electrode assembly may be wound in a jelly roll structure.

The secondary battery may further include an external case housing the electrode assembly, wherein at least one of the first and second electrode tabs may be in a bent state in the external case.

The bent state of the at least one of the first and second electrode tabs may include one of a V-shape and a U-shape.

The first and second electrode tabs may be disposed at opposite ends of the electrode assembly.

The first electrode tab may be cut to a predetermined width.

The second electrode tab may have a width, the width being greater than widths of each of the second unit tabs.

The second electrode tab may be cut to a predetermined width.

The electrode assembly may have a flat, thin, and wide shape.

The secondary battery may further include a first electrode terminal, the first electrode terminal being coupled to the first electrode tab, and a second electrode terminal, the second electrode terminal being coupled to the second electrode tab, wherein at least one of the first and second electrode tabs has a width equal to a width of the corresponding electrode terminal.

At least one of the above and other features and advantages may also be realized by providing a secondary battery including an electrode assembly including a wound first electrode plate, second electrode plate, and separator disposed therebetween, wherein the electrode assembly includes a first electrode tab including a plurality of stacked first unit tabs protruding from the first electrode plate; and a second electrode tab including a plurality of stacked second unit tabs protruding from the second electrode plate, wherein the first unit tabs are stacked in a radial direction on one side of the electrode assembly relative to a winding center line thereof.

The first electrode tab may have a width, the width being greater than widths of each of the first unit tabs.

The second electrode tab may have a width, the width being greater than widths of each of the second unit tabs.

The secondary battery may further include an external case housing the electrode assembly, wherein at least one of the first and second electrode tabs is in a bent state in the external case.

The bent state of the at least one of the first and second electrode tabs may include one of a V-shape and a U-shape.

The first and second electrode tabs may be disposed at respective ends of the electrode assembly along the winding center line thereof.

The first and second electrode tabs may be cut to predetermined widths.

The second unit tabs may be stacked in a radial direction on one side of the electrode assembly relative to the winding center line thereof.

The first and second unit tabs may be stacked in a radial direction on opposite and corresponding sides of the electrode assembly relative to the winding center line thereof.

The electrode assembly may have a flat, thin, and wide shape relative to a perpendicular direction to the winding center line, and the first unit tabs may be stacked on one side along a thickness direction of the electrode assembly with respect to the winding center line.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
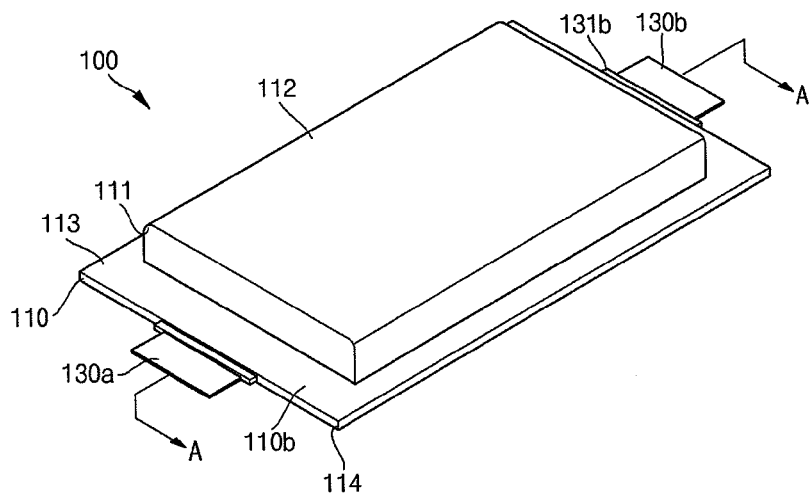
FIG. 1 illustrates a perspective view, of a secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Figure 2:
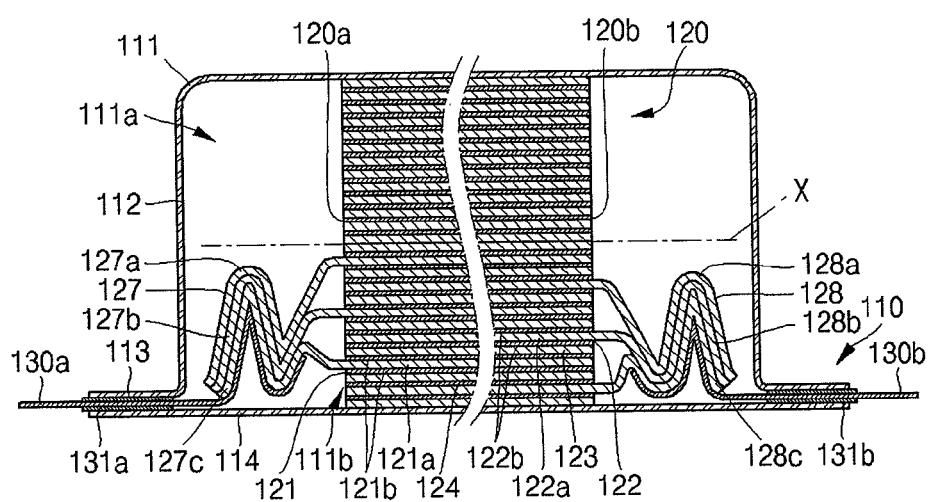
FIG. 2 illustrates a cross-sectional view taken along line A-A of FIG. 1.
Figure 3:
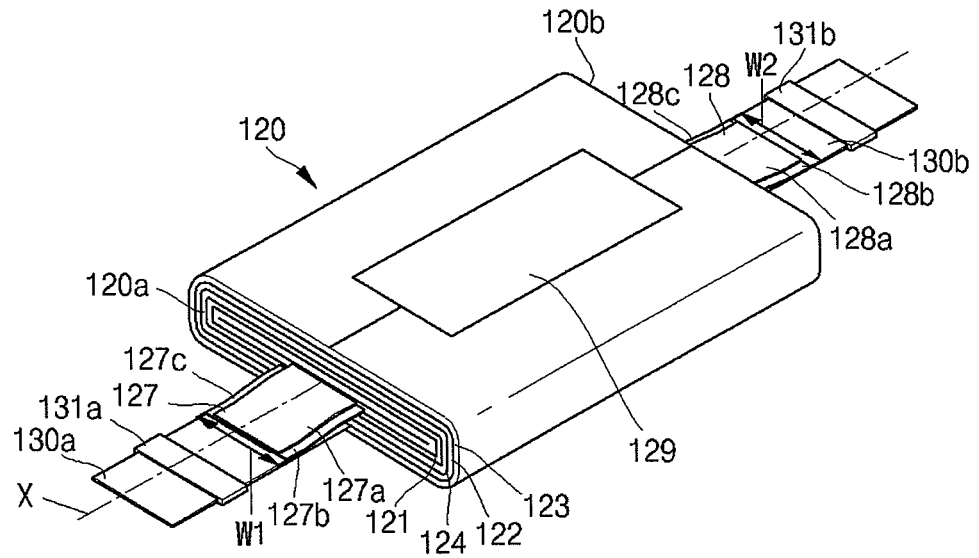
FIG. 3 illustrates a perspective view of an electrode assembly in the secondary battery of FIG. 2.

FIG. 1 illustrates a perspective view of a secondary battery according to an embodiment. FIG. 2 illustrates a cross-sectional view taken along line A-A of FIG. 1. FIG. 3 illustrates a perspective view of an electrode assembly in the secondary battery of FIGS. 1 and 2.

Referring to FIGS. 1 and 2, a secondary battery 100 may include an external case 110 and an electrode assembly 120 in the external case 110.

The external case 110 may have, e.g., a pouch shape, and may include a first sheet 111 and a second sheet 114. The first sheet 111 may include a receiving part 112 provided with a space 111a receiving the electrode assembly 120 and a flange 113 coupled to the second sheet 114. The receiving part 112 may be provided with an opening 111b. The flange 113 may extend outward from the opening 111b of the receiving part 112. The second sheet 114, which may be flat, may cover the opening 111b of the receiving part 112.

Each of the first and second sheets 111 and 114 may have a surface including a material having thermal adhesiveness. Further, films including other materials may be stacked and coupled thereto. Accordingly, when the surfaces of the materials having thermal adhesiveness are in contact with each other, the flange 113 of the first sheet 111 contacting the second sheet 114 may be heated and compressed to seal the first and second sheets 111 and 114. Thus, an edge of the external case 110 may include a sealing part 110b corresponding to the flange 113 and an outer edge of the second sheet 114.

Each of the first and second sheets 111 and 114 may have a triple layered structure of, e.g., a polyolefin layer, an aluminum layer, and a nylon layer. The polyolefin layer may have thermal adhesiveness to thereby function as a sealant. The aluminum layer may function as a base material thereby maintaining physical strength of the external case 110 and may also function as a barrier layer against moisture and oxygen. The nylon layer may function as a base material and a protective layer. In an implementation, the polyolefin layer may be formed of, e.g., casted polypropylene (CCP).

Referring to FIGS. 1 through 3, the electrode assembly 120 may include a first electrode plate 121, a second electrode plate 122, a first separator 123, and a second separator 124. The first separator 123 and the second separator 124 may be disposed between the first electrode plate 121 with the second electrode plate 122. The electrode assembly 120 may be formed by, e.g., stacking and winding the first and second electrode plates 121 and 122 and the first and second separators 123 and 124 therebetween. The electrode assembly 120 may have a flat, thin, and wide shape relative to a line perpendicular to a winding center line X. The electrode assembly 120 may have a first end 120a and a second end 120b that expose a wound structure.

The first electrode plate 121 may be, e.g., a positive electrode plate. The first electrode plate 121 may include a positive electrode collector 121a having positive electrode active materials 121b on both surfaces thereof. The positive electrode collector 121a may be formed as a conductive plate of a metal, e.g., aluminum. In an implementation, the positive electrode active materials 121b may include a layered compound including, e.g., lithium, a conductor that improves conductivity, and a binder that increases coupling force between the layered compound and conductor.

The second electrode plate 122 may be, e.g., a negative electrode plate. The second electrode plate 122 may include a negative electrode collector 122a having negative electrode active materials 122b on both surfaces thereof. The negative electrode collector 122a may be formed as a conductive plate of a metal, e.g., copper. In an implementation, the negative electrode active materials 122b may include a carbon-containing material, e.g., graphite, and a binder that increases coupling force of carbon particles. In an alternative implementation, the negative electrode active materials 122b may also be formed of, e.g., tin oxide (SnO) or lithium titanium oxide (LTO). When graphite is used for a negative electrode active material, the corresponding positive electrode plate may be formed with a smaller area than the negative electrode plate. When SnO or LTO is used for the negative electrode active material, the corresponding positive electrode plate may be formed with a larger area than the negative electrode plate.

In an implementation, the first electrode plate 121 may be a positive electrode plate and the second electrode plate 122 may be a negative electrode plate. However, the embodiments are not limited thereto. For example, the first electrode plate 121 may be a negative electrode plate and the second electrode plate 122 may be a positive electrode plate.

Fine pores (not illustrated) may be formed in the first separator 123 and the second separator 124. Lithium ions may pass through the fine pores between the two electrode plates 121 and 122. The first separator 123 and the second separator 124 may be formed of a high polymer resin, e.g., polyethylene (PE) or polypropylene (PP).

A first electrode tab 127 may protrude from the first end 120a of the electrode assembly 120. The first electrode tab 127 may include a plurality of first unit tabs 127a, 127b, and 127c. The first unit tabs 127a, 127b, and 127c may be stacked and coupled to each other such that at least portions thereof are in contact with each other. A width W1 of the first electrode tab 127 may be greater than individual widths of each of the first unit tabs 127a, 127b, and 127c. Thus, the first unit tabs 127a, 127b, and 127c may be coupled such that the first electrode tab 127 has a desired, predetermined width. Portions of the positive electrode collector 121a of the first electrode plate 121 may extend to form the first unit tabs 127a, 127b, and 127c. Thus, the first electrode tab 127 may function as a positive electrode tab. The first unit tabs 127a, 127b, and 127c may be disposed on a side of the electrode assembly 120 along a radial direction from the winding center line X. In other words, the first unit tabs 127a, 127b, and 127c may protrude parallel to and aligned with the winding center line X on one side thereof. In particular, the first unit tabs 127a, 127b, and 127c may be disposed on one side of the winding center line X along the thickness direction, i.e., stacked or tiered in a radial direction, of the electrode assembly 120.

Accordingly, the first electrode tab 127 may have a simple structure and efficient use of space may be achieved. Furthermore, when the first unit tabs 127a, 127b, and 127c are welded to form the first electrode tab 127, deformation of the electrode assembly 120 may be prevented.

In contrast to forming first unit tabs along the entire thickness direction of the electrode assembly 120 and welding them to each other such that the first unit tab disposed in the upper end may be pulled to cause deformation of the electrode assembly 120, in an implementation, the first unit tabs 127a, 127b, and 127c may be disposed on only one side of the electrode assembly 120 in the thickness direction to prevent deformation of the electrode assembly 120.

The first unit tabs 127a, 127b, and 127c may be welded using, e.g., supersonic welding or resistance welding, so as to form the first electrode tab 127. A first electrode terminal 130a protruding out of the external case 110 may be coupled to the first unit tabs 127a, 127b, and 127c. A width of the first electrode terminal 130a may be identical to the width W1 of the first electrode tab 127. A region where the first electrode tab 127 and the first electrode terminal 130a are coupled may be bent in, e.g., a V-shape or U-shape, within the external case 110 to help ensure that the secondary battery 100 may maintain a compact shape. The first electrode terminal 130a may extend through the sealing part 110b of the external case 110 to the outside. An insulating tape 131a may be wound around the first electrode terminal 130a and contact the sealing part 110b. The first electrode terminal 130a coupled to the first electrode tab 127 that is a positive electrode tab may function as a positive terminal.

A second electrode tab 128 may protrude from the second end 120b of the electrode assembly 120. The second electrode tab 128 may include a plurality of second unit tabs 128a, 128b, and 128c. The second unit tabs 128a, 128b, and 128c may be stacked and coupled to each other such that at least portions thereof are in contact with each other. A width W2 of the second electrode tab 128 may be greater than widths of each of the second unit tabs 128a, 128b, and 128c. Thus, the second unit tabs 128a, 128b, and 128c may be coupled such that the second electrode tab 128 has a desired, predetermined width. Portions of the negative electrode collector 122a of the second electrode plate 122 may extend to form the second unit tabs 128a, 128b, and 128c. Thus, the second electrode tab 128 may function as a negative electrode tab. The second unit tabs 128a, 128b, and 128c may be disposed on one side of the electrode assembly 120 along the thickness direction thereof, i.e., stacked or tiered in a radial direction thereof, opposite to where the first unit tabs 127a, 127b, and 127c are disposed from the winding center line X. In other words, the second unit tabs 128a, 128b, and 128c may protrude parallel to and aligned with the winding center line X on one side thereof. In particular, the second unit tabs 128a, 128b, and 128c may be disposed on one side of the winding center line X along the thickness direction of the electrode assembly 120. Accordingly, the second electrode tab 128 may have a simple structure and efficient use of space may be achieved. Furthermore, when the second unit tabs 128a, 128b, and 128c are welded to form the second electrode tab 128, deformation of the electrode assembly 120 may be prevented.

In contrast to forming second unit tabs along the entire thickness direction of the electrode assembly 120 and then welding them to each other such that the second unit tab disposed in the upper end may be pulled to cause deformation of the electrode assembly 120, in an implementation, the second unit tabs 128a, 128b, and 128c may be disposed only along one side of the electrode assembly 120 in the thickness direction to advantageously prevent deformation of the electrode assembly 120.

The second unit tabs 128a, 128b, and 128c may be welded using, e.g., supersonic welding or resistance welding, so as to form the second electrode tab 128. A second electrode terminal 130b protruding out of the external case 110 may be coupled to the second unit tabs 128a, 128b, and 128c. A width of the second electrode terminal 130b may be identical to the width W2 of the second electrode tab 128. A region where the second electrode tab 128 and the second electrode terminal 130b are coupled may be bent in, e.g., a V-shape or U-shape, within the external case 110 to help ensure that the secondary battery 100 may maintain a compact shape. The second electrode terminal 130b may extend through the sealing part 110b of the external case 110 to the outside. An insulating tape 131b may be wound around the second electrode terminal 130b and contact the sealing part 110b. The second electrode terminal 130b coupled to the second electrode tab 128 that is a negative electrode tab may function as a negative terminal.

Here, as illustrated in FIG. 2, it is preferable that the first and second tabs 127 and 128 are disposed under the winding center line X of the electrode assembly 120. Due to the above structure, the first and second electrode tabs 127 and 128 may be easily arranged on the second sheet 114.

A finishing tape 129 may be attached to an outer peripheral end of the wound electrode assembly 120 to beneficially prevent the electrode assembly 120 from unraveling.

A method of fabricating the secondary battery will now be described in detail.

Figure 4:
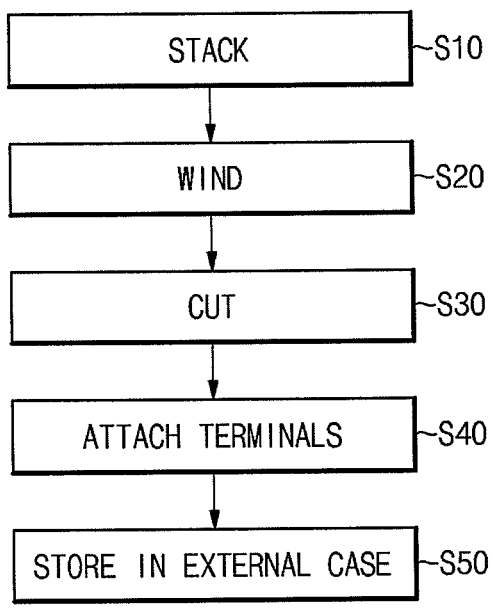
FIG. 4 illustrates a flowchart of a method of fabricating the secondary battery of FIG. 1.

FIG. 4 illustrates a flowchart of a method of fabricating the secondary battery of FIG. 1. FIGS. 5 through 8 illustrates schematic views of stages in the fabricating method of FIG. 4.

Referring to FIG. 4, a method of fabricating the secondary battery may include, e.g., stacking in operation S10, winding in operation S20, cutting in operation S30, terminal attaching in operation S40, and storing in an external case in operation S50.

First, the stacking in operation S10 will be described in detail. In the stacking in operation S10, a first electrode plate, e.g., a positive electrode plate, a second electrode plate, e.g., a negative electrode plate, and separators may be, e.g., alternately, stacked.

Figure 5:
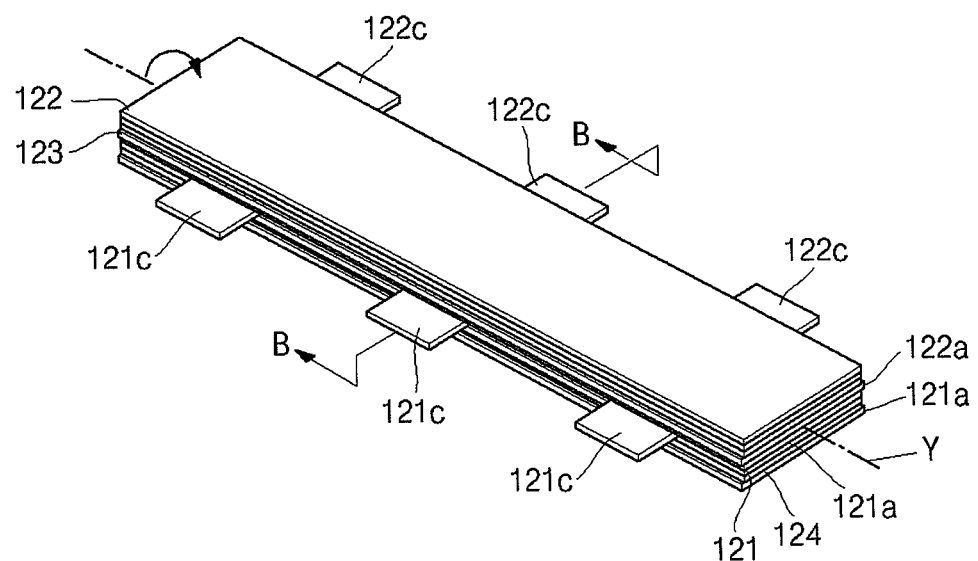
FIGS. 5 through 8 illustrate schematic views stages in the fabricating method of FIG. 4.
Figure 6:
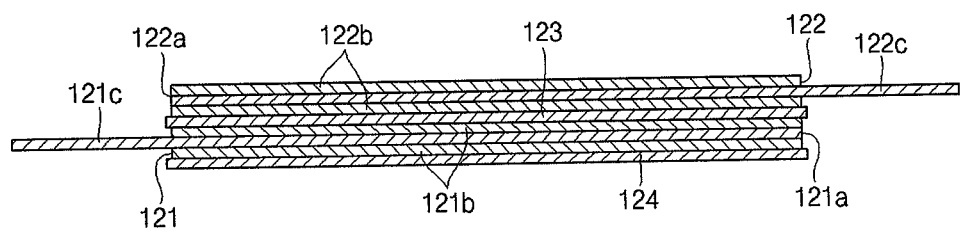

FIG. 5 illustrates a perspective view of a structure of a first electrode plate, a second electrode plate, and separators stacked during stacking operation S10. FIG. 6 illustrates a cross-sectional view taken along line B-B of FIG. 5.

Referring to FIGS. 5 and 6, from top to bottom, the second electrode plate 122, the first separator 123, the first electrode plate 121, and the second separator 124 may be stacked and may extend along an extension axis line Y. A plurality of first protrusion tabs 121c on the first electrode plate 121 and a plurality of second protrusion tabs 122c on the second electrode plate 122 may be disposed on opposite sides about the extension axis line Y.

Portions of the positive electrode collector 121a of the first electrode plate 121 may extend out of the stacked structure to form the first protrusion tabs 121c. Distances between the first protrusion tabs 121c may correspond to circumferences of the wound structure. Accordingly, after the winding, the first protrusion tabs 121c may be arrayed, i.e., aligned, along a radial direction from a winding center.

Portions of the negative electrode collector 122a of the second electrode plate 122 may extend out of the stacked structure to form the second protrusion tabs 122c. The second protrusion tabs 122c may be disposed at positions corresponding to the first protrusion tabs 121c. Accordingly, after the winding, the second protrusion tabs 122c may be arrayed, i.e., aligned, along the radial direction from the winding center, like the first protrusion tabs 121c.

The winding in operation S20 will now be described in detail. The winding in operation S20 may include an operation of winding the stacked structure illustrated in FIG. 5.

Figure 7:
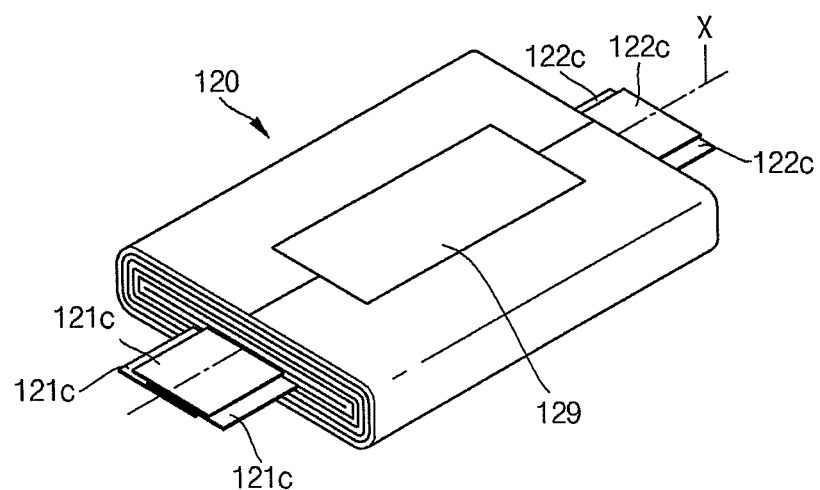

In particular, from the stacked state illustrated in FIG. 5, the stacked first electrode plate 121, second electrode plate 122, and first and second separators 123 and 124 may be flatly wound along the extension axis line Y, as indicated by the arrow. FIG. 7 illustrates a state after completion of the winding in operation S20. Referring to FIG. 7, the first protrusion tabs 121c and the second protrusion tabs 122c may be respectively disposed at opposite sides of the electrode assembly 120 along the winding center line X. The first protrusion tabs 121c may at least partially overlap each other along the width direction thereof, i.e., orthogonal to the winding center line X. The finishing tape 129 may be attached to an outer peripheral end of the wound electrode assembly 120 to prevent unraveling.

The cutting in operation S30 will be described in detail. The cutting in operation S30 may include an operation of cutting the first protrusion tabs 121c and the second protrusion tabs 122c.

Figure 8:
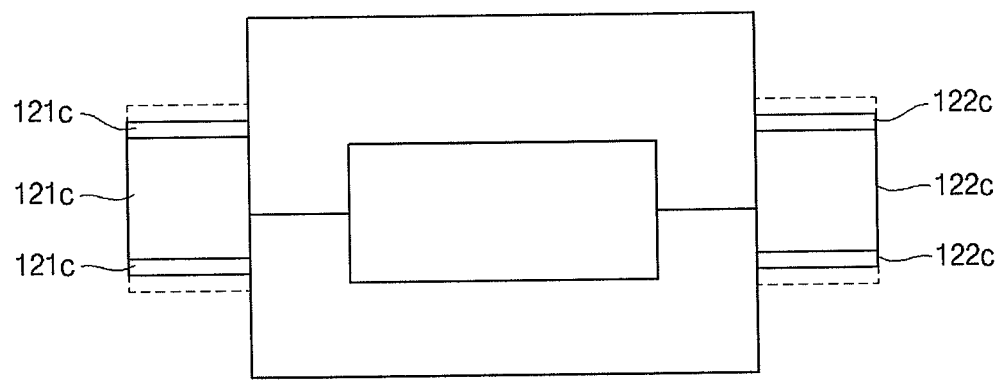

From the state illustrated in FIG. 7, the portions of the first protrusion tabs 121c and the second protrusion tabs 122c depicted with dotted lines of FIG. 8 along the width direction may be cut. Accordingly, the first electrode tab 127 of FIG. 3 and the electrode tab 128 of FIG. 3 may have desired, predetermined widths.

The terminal attaching in operation S40 will now be described in detail. The terminal attaching in operation S40 may include an operation of forming a first terminal that is a positive electrode terminal and a second terminal that is a negative electrode terminal.

From the state illustrated in FIG. 8, the first electrode terminal 130a and the second electrode terminal 130b of FIG. 3 may be respectively attached through, e.g., heat welding, to the first protrusion tabs 121c and the second protrusion tabs 122c to assume the state illustrated in FIG. 3. Here, at the attached portion of the first electrode terminal 130a, the first protrusion tabs 121c may be coupled together to form the first electrode tab 127. At the attached portion of the second electrode terminal 130b, the second protrusion tabs 122c may be coupled together to form the second electrode tab 128. The insulating tapes 131a and 131b may be wound around the first electrode terminal 130a and second electrode terminal 130b, respectively.

The storing in an external case in operation S50 will be described in detail. The storing in an external case in operation S50 may include an operation of storing, i.e., housing, the electrode assembly in an external case. The electrode assembly 120 configured as illustrated in FIG. 3 may be stored in the receiving part 112 of the first sheet 111 in the external case 110 illustrated in FIG. 2. Next, the second sheet 114 may be attached by, e.g., heat welding, to the flange 113 of the first sheet 111 to seal the first sheet 111 and the second sheet 114. In an implementation, the first electrode tab 127 and the second electrode tab 128 may be bent in, e.g., V-shapes, within the external case 110. Also, the insulating tape 131a surrounding the positive electrode terminal 130a and the insulating tape 131b surrounding the negative electrode terminal 130b may be disposed at the sealing part 110b of the external case 110.

By way of review, for electrode assemblies formed by winding, aligning the plurality of positive electrode tabs and negative electrode tabs may not be easy; and therefore this subject matter area has recently attracted attention.

According to an embodiment, the entire width of the electrode tab including the overlapped unit tabs may be greater than the width of each unit tab, thus easily forming the electrode tab with a desired width.

In addition, since all the unit tabs of an electrode may be disposed on one side of the electrode assembly with respect to the winding center thereof, efficient use of space may be achieved, and deformation of the electrode assembly in the fabrication may be prevented.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery, comprising:
an electrode assembly including a wound first electrode plate, second electrode plate, and separator disposed therebetween,
wherein the electrode assembly includes:
a first electrode tab including a plurality of stacked first unit tabs protruding from the first electrode plate; and
a second electrode tab including a plurality of stacked second unit tabs protruding from the second electrode plate,
wherein:
the first or second unit tabs are stacked in a radial direction on one side of the electrode assembly relative to a winding center line thereof,
the first and second electrode tabs are disposed at respective ends of the electrode assembly along the winding center line thereof, and
the first and second electrode tabs are disposed under the winding center line of the electrode assembly.

2. The secondary battery as claimed in claim 1, wherein the first or second electrode tab has a width, the width being greater than a width of at least one of the first or second unit tabs.

3. The secondary battery as claimed in claim 1, further comprising an external case housing the electrode assembly, wherein at least one of the first and second electrode tabs is in a bent state in the external case.

4. The secondary battery as claimed in claim 3, wherein the bent state of the at least one of the first and second electrode tabs includes one of a V-shape and a U-shape.

5. The secondary battery as claimed in claim 1, wherein the first and second electrode tabs are cut to predetermined widths.

6. The secondary battery as claimed in claim 1, wherein the first and second unit tabs are stacked in a radial direction on opposite and corresponding sides of the electrode assembly relative to the winding center line thereof.

7. The secondary battery as claimed in claim 2, wherein the electrode assembly has a flat, thin, and wide shape relative to a perpendicular direction to the winding center line, and
the first unit tabs are stacked on one side along a thickness direction of the electrode assembly with respect to the winding center line.

8. The secondary battery as claimed in claim 1, wherein:
the first and second electrode tabs are respectively disposed at opposite ends of the electrode assembly, the ends being spaced apart from one another along the winding center line of the electrode assembly, and
the first and second electrode tabs are entirely disposed on a same half of the electrode assembly when the electrode assembly includes two halves formed by a plane that includes the winding center line.

9. The secondary battery as claimed in claim 1, wherein the first unit tabs or the second unit tabs are formed as one piece with the first electrode plate or the second electrode plate, respectively.

10. The secondary battery as claimed in claim 2, wherein the width of the first electrode tab or the second electrode tab is greater than an individual width of each of the first unit tabs or second unit tabs, respectively.

11. The secondary battery as claimed in claim 4, wherein the one of the V-shape and the U-shape has a concavity open in a direction away from the winding center line.

12. The secondary battery as claimed in claim 1, wherein the first unit tabs or the second unit tabs are radially aligned.

\* \* \* \* \*